United States Patent
Satoh et al.

[11] Patent Number: 6,151,461
[45] Date of Patent: Nov. 21, 2000

[54] FACSIMILE DEVICE AND METHOD OF CONTROLLING OPERATION OF FACSIMILE DEVICE

[75] Inventors: Fumio Satoh, deceased, late of Kanagawa; by Hiroyuki Satoh, legal representative, Yokohama, both of Japan

[73] Assignee: Ricoh Company, Ltd., Tokyo, Japan

[21] Appl. No.: 09/391,829

[22] Filed: Sep. 8, 1999

[30] Foreign Application Priority Data

Sep. 8, 1998 [JP] Japan .................................. 10-254106

[51] Int. Cl.⁷ .................................................. G03G 15/16
[52] U.S. Cl. .............................. 399/66; 399/45; 399/101
[58] Field of Search ................................ 399/66, 45, 388, 399/389, 394, 101, 16, 43, 19; 271/264, 265.01

[56] References Cited

U.S. PATENT DOCUMENTS

| | | | |
|---|---|---|---|
| 5,713,063 | 1/1998 | Oono .......................................... | 399/66 |
| 5,822,649 | 10/1998 | Karashima et al. ....................... | 399/66 |
| 5,828,927 | 10/1998 | Yoo et al. ................................. | 399/101 |
| 5,848,321 | 12/1998 | Roh et al. .................................. | 399/45 |

FOREIGN PATENT DOCUMENTS

| | | |
|---|---|---|
| 60-142370 | 7/1985 | Japan . |
| 4-280262 | 10/1992 | Japan . |
| 7-104590 | 4/1995 | Japan . |
| 8102817 | 4/1996 | Japan . |

*Primary Examiner*—Sophia S. Chen
*Attorney, Agent, or Firm*—Cooper & Dunham LLP

[57] ABSTRACT

A facsimile device includes an electrophotographic photosensitive body on which a toner image is formed and capable of being brought into contact with a sheet of paper for recording the toner image on the sheet of paper based on received data and a paper feeding device for conveying sheets of paper via a paper feeding system to a transfer position. An image transferring device is provided at the transfer position for transferring a toner image to the sheets of paper conveyed to the transfer position by the paper feeding system at a nip portion formed between the electrophotographic photosensitive body and the sheet of paper. A registration roller controls a timing at which the sheet of paper is conveyed to the transfer position. A pre-registration sensor detects the sheet of paper, conveyed by the paper feeding device, at an upstream side of the registration roller. A controller controls at least one of a voltage level and a transfer current level of the image transferring device based on an output by the pre-registration sensor.

30 Claims, 5 Drawing Sheets

FACSIMILE DEVICE AND METHOD OF CONTROLLING OPERATION OF FACSIMILE DEVICE

BACKGROUND

1. Field

The present invention relates to a facsimile device and a method of controlling the operation of the facsimile device, and more particularly, to the control in an image forming portion of the device to solve or eliminate problems occurring mainly when cut sheets of paper employed as the recording media are not conveyed properly.

2. Discussion of the Background Art

Typically, two types of recording methods can be used as recording methods in a recording apparatus for a facsimile device; a thermal-type recording method and an electrophotographic-type recording method. In recent years, a facsimile device which uses a recording apparatus of the electrophotographic recording type for recording on cut sheets of paper as the recording medium has become popular.

In this type of facsimile device, for instance, the signal from the transmitting-side facsimile device is received and cut sheets of paper contained in a paper feeding tray or a paper feeding cassette, etc. are fed and conveyed for recording. A toner image is formed on an electrophotographic photosensitive body such as a photosensitive belt on the basis of the image information in the received data, and then the toner image thus formed is transferred to the cut sheets of paper. In such a way, the received information is recorded.

There are various sorts of methods for forming the toner image on an electrophotographic photosensitive body. One such method is a contact-type developing method of applying a uniform electric charge onto the surface of an electrophotographic photosensitive body by use of a charger, forming a latent image by use of a laser light or a LED chromophoric light etc., bringing a developing roller, having a constant amount of toner attached to the surface thereof which is charged (positively charged) to an electric potential to an extent of exerting Coulomb's force onto the latent image area, into contact with the surface of the electrophotographic photosensitive body, and thereby performing an operation of transferring the toner so as to put the toner on the latent image area by the action of the electrostatic force.

The recording operation for recording on the cut sheets of paper in the facsimile device using the aforementioned electrophotographic photosensitive body is generally explained hereinafter. A cut sheet of paper is fed by a paper feeding section and is detected by a sensor (pre-registration sensor). Thereafter, the cut sheet of paper is conveyed with a timing coinciding with the toner image formed on the surface of the electrophotographic photosensitive body by use of a registration roller. The toner image is then electrostatically transferred at a nip portion formed between the electrophotographic photosensitive body and a transfer unit, from the electrophotographic photosensitive body to the cut sheet of paper. After completing the transferring operation, the cut sheet of paper having the transferred toner image is conveyed to a fixing unit and the toner image on the cut sheet of paper is heated and fixed. After finishing the operation of fixing the toner image, the cut sheet of paper is discharged outside of the apparatus (e.g., facsimile device).

Many facsimile devices are premised on the fact that a facsimile signal can be received even when an operator is not present and the received signal can be recorded on the cut sheets of paper. However, when the cut sheets of paper cannot be conveyed for some reason at the time of performing the aforementioned recording operation, such non-conveyance state of the paper is detected and a signal indicating a receiving error is generated, and thereby the receiving of the signal and the recording thereof on the paper are interrupted.

Japanese Laid-open Patent Publication No. 8-102,817/1996 (the '817 patent) describes a device for addressing the above-noted problems. The device is provided with a controller included in a facsimile device which uses cut sheets of paper as the recording paper. When a recording operation is to be performed on the basis of received data, the cut sheet of paper is fed from a paper feeding part to a recording part and, at this time, if the non-conveyance of the paper occurs, a re-feeding operation for re-feeding the cut sheet of paper is repeatedly performed a predetermined number of times.

Furthermore, the '817 patent describes a structure provided with a controller, in which a voltage of an inverse polarity to the polarity at the time of transferring is applied to the transfer roller, in order to prevent the transfer roller from becoming dirty with the toner. A contact-type transfer roller serving as a transfer unit is employed. The transfer roller performs the operation of transferring the toner image onto the cut sheet of paper at the nip portion between the electrophotographic photosensitive body and the contact-type transfer roller.

However, the structure as described in the '817 patent cannot be applied to recording apparatuses adopting all methods of electrophotographic recording.

For instance, a constant amount of toner is attached to the surface of the developing roller and the developing roller is brought into contact with the surface of the electrophotographic photosensitive body. Thereby, the toner can be transferred to the latent image formed on the photosensitive body by the action of the electrostatic force.

However, when adopting such contact-type developing method of transferring the toner, there may exist some toner which is inversely charged on the developing roller. In such a case, the inversely charged toner is transferred onto the non-latent-image portion of the electrophotographic photosensitive body.

Furthermore, as described in the '817 patent, in which a voltage having an inverse polarity to that at the time of transferring is applied to the above-mentioned contact-type transfer roller, the aforementioned inversely charged toner is transferred to the transfer roller which is brought into contact with the electrophotographic photosensitive body. For this reason, the transfer roller inevitably becomes dirty.

SUMMARY OF THE INVENTION

A facsimile device comprises an electrophotographic photosensitive body on which a toner image is formed and capable of being brought into contact with a sheet of paper for recording the toner image on the sheet of paper based on received data and a paper feeding device for conveying sheets of paper via a paper feeding system to a transfer position. An image transferring device is provided at the transfer position for transferring a toner image to the sheets of paper conveyed to the transfer position by the paper feeding system at a nip portion formed between the electrophotographic photosensitive body and the sheet of paper. A registration roller controls a timing at which the sheet of paper is conveyed to the transfer position. A pre-registration sensor detects the sheet of paper, conveyed by the paper feeding device, at an upstream side of the registration roller a controller controls at least one of a voltage level and a transfer current level of the image transferring device based on an output by the pre-registration sensor. When the paper feeding device attempts to convey a sheet of paper and the pre-registration sensor does not detect a conveyed sheet, the controller can control the paper feeding device to attempt once again to convey a sheet of paper. After the paper feeding device starts to convey a sheet of paper, the controller can perform a control operation for applying an approximately zero-level voltage to the transferring device during a time period until the pre-registration sensor detects the sheet of paper and a time period prior to a constant time period elapsing after the pre-registration sensor detects the sheet of paper.

The controller can perform a second control operation for forming a latent image on electrophotographic photosensitive body after a constant time period has elapsed from the time when the pre-registration sensor detects the sheet of paper. After the paper feeding device starts to convey a sheet of paper the controller can perform a control operation for applying an electric charge of normal transfer current level to the transferring device during a time period until the pre-registration sensor detects the sheet of paper and a time period prior to a constant time period elapsing after the pre-registration sensor detects the sheet of paper. The controller can also perform a second control operation for forming a latent image on the electrophotographic photosensitive body after a constant time period has elapsed from the time when the pre-registration sensor detects the sheet of paper. The facsimile device may further comprise a stepping motor for driving the paper feeding device. The controller, when the paper feeding device attempts to convey a sheet of paper and thereafter the pre-registration sensor detects that the sheet of paper has not been conveyed, performs control operations of temporarily stopping driving of the stepping motor and starts again the driving of the stepping motor in order to again attempt to convey the sheet of paper. After a constant time period elapses from the time when the pre-registration sensor detects the sheet of paper, the controller performs control operations for forming a latent image on the electrophotographic photosensitive body.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 1:
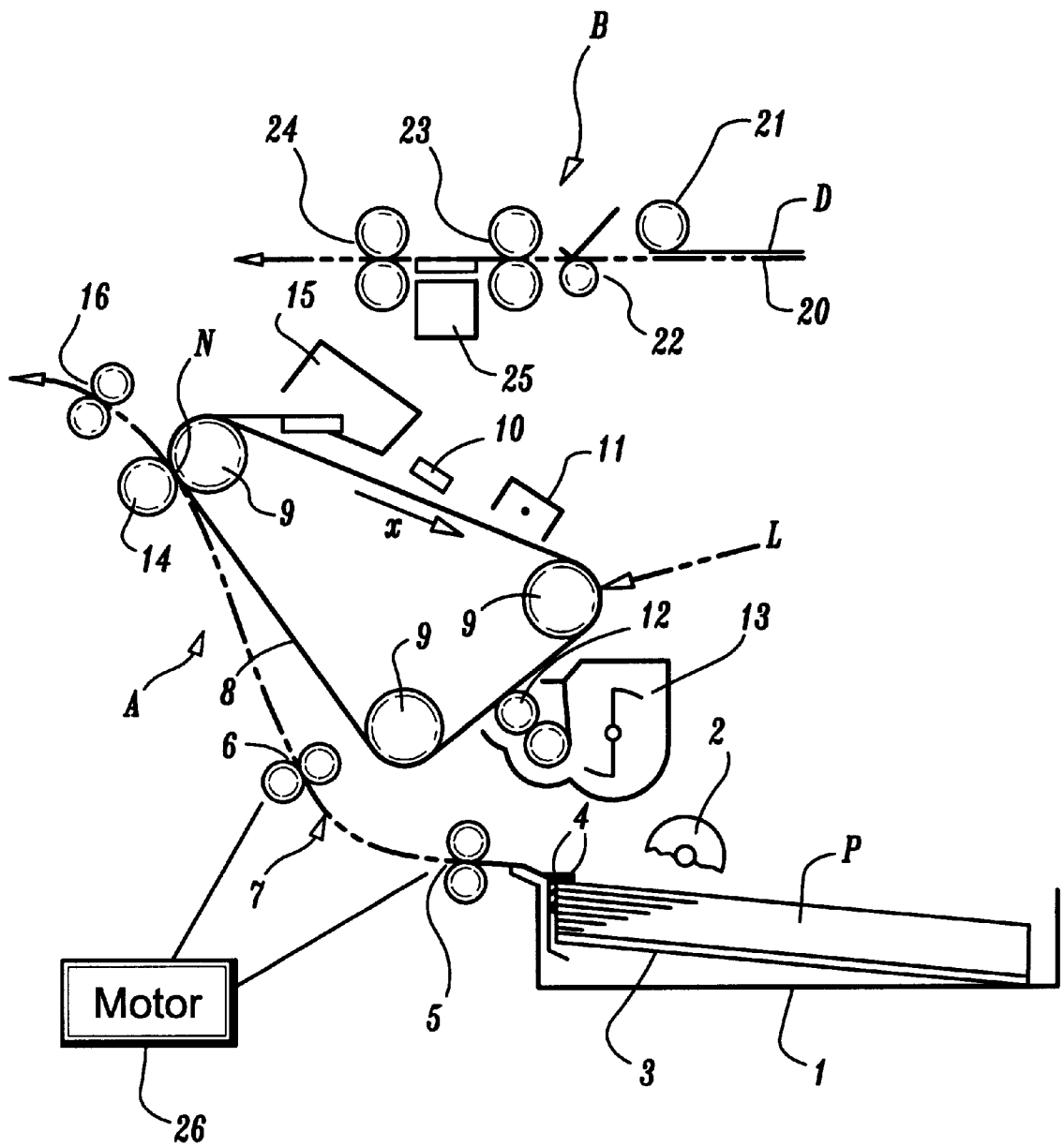
FIG. 1 is an outlined structural diagram of facsimile device for illustrating a first embodiment of the present invention.

In describing preferred embodiments of the present invention illustrated in the drawings, specific terminology is employed for the sake of clarity. However, the present invention is not intended to be limited to the specific terminology so selected and it is to be understood that each specific element includes all technical equivalents which operate in a similar manner.

Figure 2:
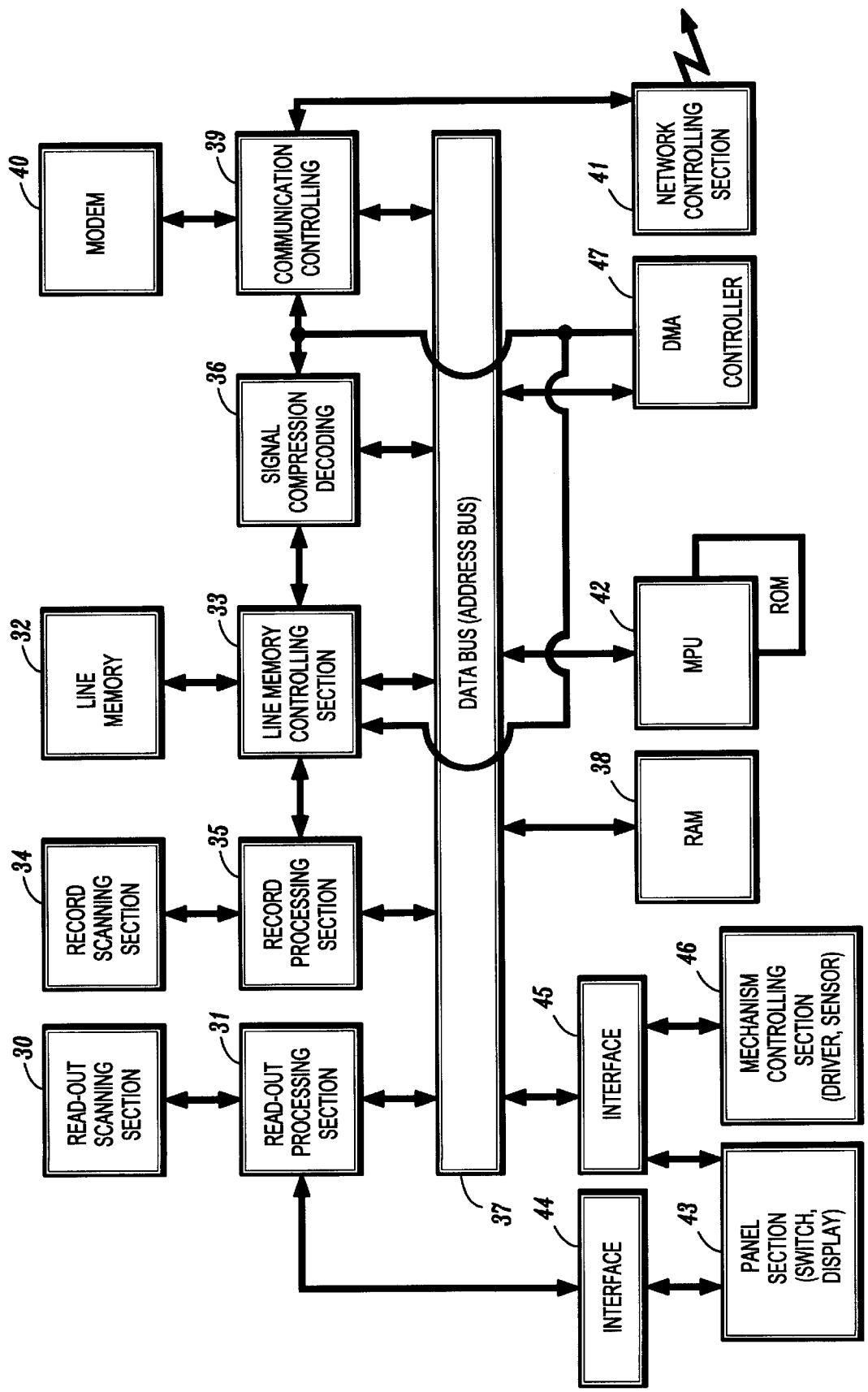
FIG. 2 is a block diagram for illustrating the main structure of a control system according to the first embodiment according to the present invention.

Referring now to the drawings, wherein like reference numerals designate identical or corresponding parts throughout the several views, and more particularly to FIGS. 1 and 2 thereof, there are illustrated a facsimile device and a method of controlling the operation of the facsimile device.

An embodiment of the present invention relates to a facsimile device which includes an electrophotographic photosensitive body on which a toner image is formed and capable of being brought into contact with a sheet of paper for recording the toner image on the sheet of paper based on received data and a paper feeding device for conveying sheets of paper via a paper feeding system to a transfer position. An image transferring device is provided at the transfer position for transferring a toner image to the sheets of paper conveyed to the transfer position by the paper feeding system at a nip portion formed between the electrophotographic photosensitive body and the sheet of paper. A registration roller controls a timing at which the sheet of paper is conveyed to the transfer position. A pre-registration sensor detects the sheet of paper, conveyed by the paper feeding device, at an upstream side of the registration roller. A controller controls at least one of a voltage level and a transfer current level of the image transferring device based on an output by the pre-registration sensor. When the paper feeding device attempts to convey a sheet of paper and the pre-registration sensor does not detect a conveyed sheet, the controller can control the paper feeding device to attempt once again to convey a sheet of paper. After the paper feeding device starts to convey a sheet of paper, the controller can perform a control operation for applying an approximately zero-level voltage to the transferring device during a time period until the pre-registration sensor detects the sheet of paper and a time period prior to a constant time period elapsing after the pre-registration sensor detects the sheet of paper.

In such structure as mentioned above, even when the cut sheet of paper cannot be normally fed and therefore the paper feeding operation has to be repeated, the latent image formation is performed based on the detection by the pre-registration sensor, and the zero-volt level voltage is applied to the transfer medium (roller) until the time when the cut sheet of paper arrives at the place near the transferring position. Consequently, the normal development toner does not arrive at the transfer medium (roller) in the state of the non-existence of the cut sheet of paper, and thereby the dirt pollution onto the transfer medium due to the positively-charged toner can be prevented.

Furthermore, even in the structure in which the electrophotographic photosensitive body is brought into direct contact with the transfer medium (roller) and the negatively (inversely)-charged toner exists on the electrophotographic photosensitive body, since the transfer roller is at the zero-volt level, the Coulomb's force is weak (faint) and thereby the dirt pollution of the transfer roller due to the inversely-charged toner being transferred thereto can be prevented.

Another embodiment relates to a facsimile device in which the control unit, after starting the paper conveying operation by the paper feeding unit, performs a control operation for applying an electric charge of normal transfer current level to the image transferring unit during a time period until the pre-registration sensor detects the cut sheet of paper and a time period prior to a constant time elapsing after the pre-registration sensor detects the cut sheet of paper. Another control operation can be performed for forming a latent image on the electrophotographic photosensitive body after a constant time period has elapsed from the time when the pre-registration sensor detects the cut sheet of paper.

In such structure as mentioned above, similarly, even when the cut sheet of paper cannot be normally fed and as the result the paper feeding operation is repeated, according to the facsimile device of the present invention, the latent image formation is performed based on the detection by the pre-registration sensor, and a charge of a normal transfer current level is applied to the transfer medium (roller) until the time when the cut sheet of sheet of paper arrives at a place near the transfer position. Consequently, the toner for the normal development does not arrive at the transfer medium in the state of the non-existence of the cut paper, and thereby dirt pollution due to the positively-charged toner being transferred onto the transfer medium can be prevented.

Furthermore, even in the structure in which the electrophotographic photosensitive body is brought into direct contact with the transfer medium and the negatively (inversely)-charged toner exists on the electrophotographic photosensitive body, since the transfer roller is at the normal transfer level, the Coulomb's force repelling the inversely-charged toner is exerted upon the transfer roller, and thereby dirt pollution on the transfer roller due to the inversely-charged toner can be positively prevented.

Another embodiment of the present invention relates to a the facsimile device, in which the control unit is constructed such that, when the paper feeding unit attempts to perform the operation of the conveying paper and thereafter the cut paper turns out not to be conveyed at the time of forming image by use of the recording unit, a control unit performs the control operations of temporarily stopping the driving of a stepping motor used for conveying the paper and thereafter again starts the driving of the stepping motor in order to again attempt to convey the cut sheet of paper. After a constant time period elapses from the time when the pre-registration sensor detects the cut sheet of paper, the control unit performs control operations for forming a latent image on the electrophotographic photosensitive body.

Another embodiment relates to a facsimile device comprising a recording unit forming a toner image on an electrophotographic photosensitive body on the basis of received data, a paper feeding unit conveying cut sheets of paper via paper feeding path to a transfer position, the paper feeding device being driven by a stepping motor as a main driving source. An image transferring unit transfers the toner image formed on the electrophotographic photosensitive body to the cut sheet of paper conveyed to the transfer position by the paper feeding unit. A registration roller controls a timing at which the sheet of paper is conveyed to the transfer position. A pre-registration sensor detects the cut sheet of paper conveyed by the paper feeding unit at an upstream side of the registration roller. A control unit, when the paper feeding unit attempts to convey a sheet of paper and thereafter the sensor senses that the paper was not conveyed at the time of image forming, controls driving of the stepping motor to temporarily stop driving and thereafter the driving of the stepping motor is started again in order to attempt again to convey the paper. After a constant time period elapses from the time point when the pre-registration sensor detects the cut paper, a latent image is formed on the electrophotographic photosensitive body.

Furthermore, in such structure as mentioned above, in consideration of the problems of the malfunction (disordered rotation, etc.) of the stepping motor serving as the main driving source of the paper, when the cut paper cannot be conveyed, the paper feeding operation including the operation of starting again the drive of the stepping motor is performed, and thereby the further stable paper feeding operation can be performed.

EMBODIMENTS OF THE INVENTION

Figure 3:
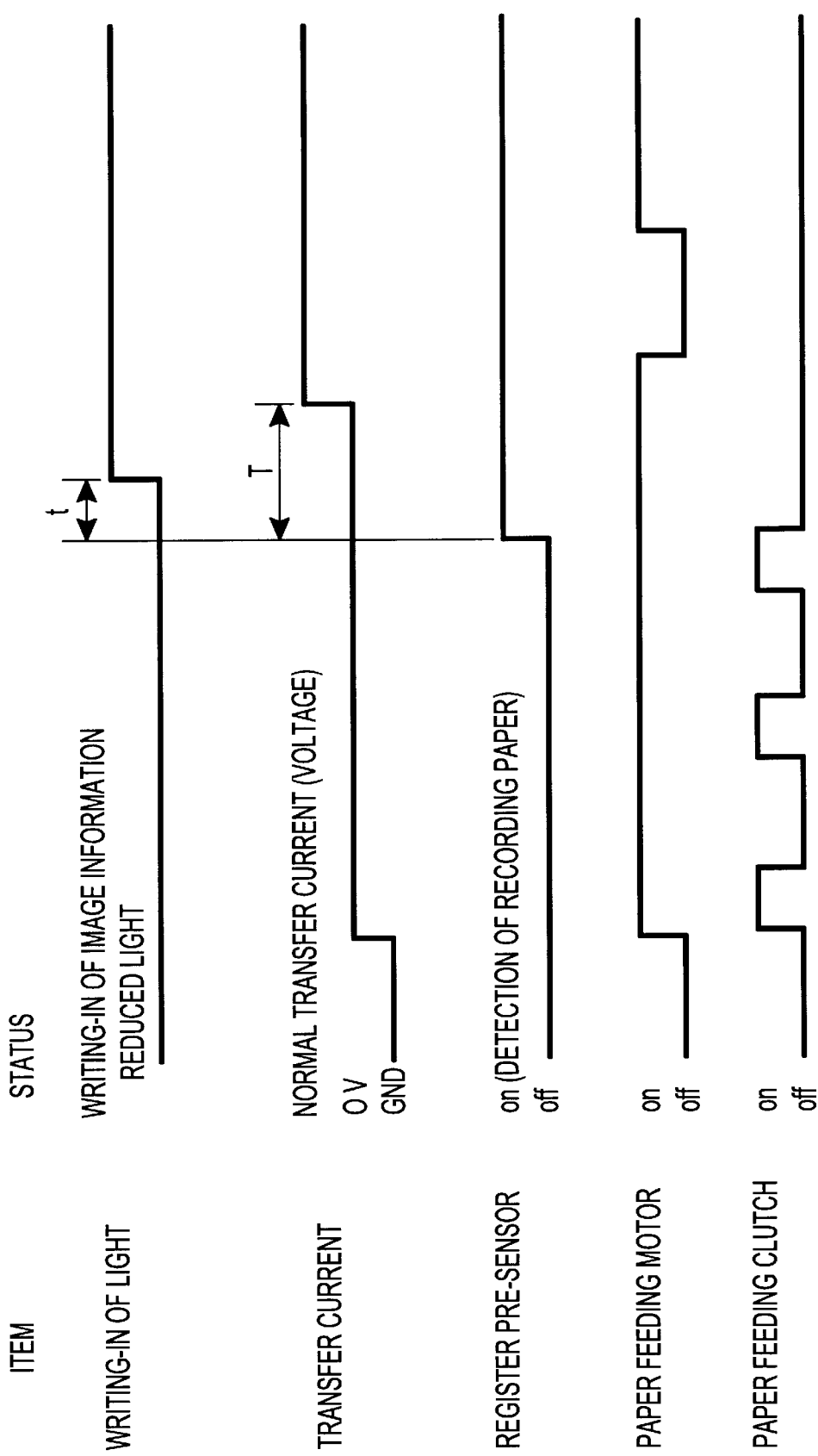
FIG. 3 is a timing chart for explaining a paper feeding operation according to the first embodiment of the present invention.

The preferred embodiments according to the present invention are described hereinafter, referring to the accompanying drawings; FIGS. 1 through 3.

First Embodiment

FIG. 1 is an outlined structural view of a facsimile device illustrating the first embodiment of the present invention. In an image forming portion A of the facsimile device, reference numeral 1 represents a paper feeding tray for piling therein plural sheets of cut paper P which are respectively cut in a predetermined size. A paper feeding roller 2 is formed in a semispherical shape and a bottom plate 3 is provided for lifting up the plural sheets of the cut paper P. A separation claw 4 temporarily stops the corner (square) portion of the sheets of the cut paper P lifted up by the bottom plate 3 and separates the sheets of cut paper P sheet by sheet in cooperation with the paper feeding roller 2. A pair of paper conveying rollers 5 and a pair of registration rollers 6 convey the sheets of paper P. A pre-registration sensor 7 is provided for detecting the conveyed sheets of paper P. A photosensitive belt 8 of an electrophotographic photosensitive body is supported and driven by a plurality of rollers 9 and rotatively driven in a direction shown by arrow X.

Around the photosensitive belt 8, there are arranged a charge removing unit 10, a charging unit 11 for forming a uniform charge on the phototsensitive belt 8 and a developing unit 13 for forming a toner image on belt 8. That is, developing roller 12 of developing unit 13 is brought into contact with the photosensitive belt 8 for forming the toner image thereon. A transfer roller 14 performs a toner transferring operation for transferring the toner image from belt 8 to the sheet of paper P. The toner image is transferred at the nip portion N formed between the photosensitive belt 8 and the transfer roller 14, the roller 14 being brought into contact with the photosensitive belt 8 through the cut sheet of paper P at the nip portion N. A cleaning unit 15 is provided for removing and withdrawing the toner, etc. remaining on the photosensitive belt 8 after transferring, and a fixing unit 16 composed of a heating roller and a pressurizing roller performs an operation of fixing the image formed on the cut sheet of paper P after transferring.

When the cut sheet of paper is conveyed at the time of forming the image thereon, a paper feed driving apparatus composed of a stepping motor 26 (serving as a paper feeding motor) and a paper feeding clutch, etc. respectively start movement and a driving force is transferred to rollers 5, 6, and thereby the paper conveying roller 5 and the registration roller 6 are respectively rotated.

The driving force is also transmitted to the paper feeding roller 2 through the paper feeding clutch, and thereby the paper feeding roller 2 is rotated. Every time the paper feeding roller 2 rotates once (360°), the uppermost sheet among the sheets of the cut paper P piled on the paper feeding tray 1 is fed (conveyed) in a direction toward the paper conveying roller 5. That is, a corner portion of the cut paper P tip end in the paper feeding direction is stopped by the separation claw 4. In such state, only the uppermost sheet of the cut paper P is separated by the separation claw 4 from the other sheets and fed (conveyed) in the direction toward the paper conveying roller 5 and further fed (conveyed) in the direction toward the registration roller 6.

The cut sheet of paper P is detected by the pre-registration sensor 7 before arriving at the registration roller 6. The cut paper P is held in a waiting position at the registration roller 6 so as to coincide with the toner image formed on the photosensitive belt 8. The cut paper P is then further conveyed with a proper timing in the direction toward the nip portion N between the transfer roller 14 and the photosensitive belt 8 at a time to coincide with the toner image which is formed on the rotating photosensitive belt 8.

To form the toner on the belt 8, the photosensitive belt 8 is rotatively driven by the rollers 9, and any electric charge remaining on the photosensitive belt 8 is removed. The surface of the belt is then uniformly charged by the charging unit 11. Thereafter, the photosensitive belt 8 is scanned by the laser light L at an exposing position. In such way, an electrostatic latent image is formed on the photosensitive belt 8. The electrostatic latent image thus formed is then developed by transferring the toner attached to the circumferential part of the developing roller 12 to the photosensitive belt 8.

Thereafter, the cut sheet of paper P is conveyed to the nip portion N between the transfer roller 14 and the photosensitive belt 8 with the proper timing, by the registration roller 6. The toner image is electrostatically transferred onto the cut sheet of paper P by the transfer roller 14. Thereafter, the cut sheet of paper P having the transferred toner image is conveyed to the fixing unit 16 and the toner image is fixed on the cut sheet of paper P, and the cut sheet of paper P is discharged.

Furthermore, in a document reading-out section B as shown in FIG. 1, the reference numeral 20 represent a document setting stand. A paper feeding roller 21 feeds a document D piled on the document setting stand 20 and a separating/conveying section 22 composed of a separation pad and a feed-roller separates and conveys the document sheet by sheet. A read-out sensor 25 is disposed at a position between the paper conveying rollers 23 and 24 reads out the document D conveyed by the conveying rollers 23 and 24.

FIG. 2 is a block diagram for illustrating the main structure of a control system in the first embodiment of the present invention. The control system in the document reading-out section B is composed of a read-out/scanning section, 30, a reading-out processing section 31, a line memory 32, and a line memory controlling section 33. The control system in the image forming section A is composed of a recording/scanning section 34, a record processing section 35, line memory 32, line memory controlling section 33, and a developing unit (FIG. 1).

In the document reading-out section B, the image information read out by the reading-out/scanning section 30 is temporarily stored in the line memory 32 through the reading-out processing section 31. The image information from the line memory 32 is read out in accordance with a data compression mode in a signal compressing/restoring section 36. At this time, the redundancy (ratio) is removed from the image information, and the information is stored in a RAM 38 through a data bus 37. The RAM 38 is utilized as a transmission buffer, and the image information is sent out to a MODEM 40 through a communication controlling section 39. The signal modulated in the MODEM 40 is sent out to a (telephone) circuit through a network controlling section 41.

On the other hand, the image information signal received from the (telephone) circuit passes through the network controlling section 41, and is demodulated by the MODEM 40 and outputted to the data bus 37 through the communication controlling section 39. The outputted image information is stored in the RAM 38.

The RAM 38 is utilized as a receiving buffer, and the image information is inputted in order to the signal compressing/restoring section 36 through the data bus 37 for the purpose of restoring the data. Furthermore, the image information is read out again from the line memory 32 and inputted to the recording/scanning section 34 through the record processing section 35. The recording/scanning section 34 emits the laser light L on the basis of the image information and forms an electrostatic latent image on the photosensitive belt 8.

Regarding the received image information, the information passes through the network controlling section 41 and the communication controlling section 39, the received image information is decrypted (decoded) in the communication controlling section 39 and a practicing process such as a transmission control, error control, etc. is performed. In case that journal information is required, the image information is stored in the RAM 38 having a nonvolatile function.

Furthermore, a calling-out signal, etc. for controlling the network is controlled by the network controlling section 41. Furthermore, image information not requiring information compression and restoration is directly taken out from the reading-out processing section 31 and the line memory 32 and directly sent out to an exterior unit such as the RAM 38 through the data bus 37. Thereby, image processing or image communication can be made possible.

Furthermore, it is also possible to directly input the image-processed information or the image-composed information. It is further possible to superpose the image information upon other image information, and to store the superposed image information in the line memory 32 and record/reproduce the information. The line memory 32 can be used separate from the signal compressing/restoring section 36. In addition, it is also possible to restore the signal which is compressed regardless of the reading-out scanning or the recording scanning and output the compressed signal through the line memory 32.

The control operations including the system control in the entire device, the control of the signal flow, the communication control, and the network control, etc. are performed by the MPU (Micro Processing Unit) 42. Operator control or input is performed using a panel portion 43 via interface 44 for controlling various functions including controlling the mechanical structure for the image forming section A and the document reading-out section B.

Regarding panel portion 43, the number of input/output terminals and/or the controlling method thereof may vary in accordance with the type and model of the switch panel and the display panel used. Furthermore, as to a mechanism controlling section 46, the type and number of drivers and sensors may vary in accordance with the system or mechanical structure of the image forming section A and the document reading-out section B. Control of mechanism controlling section 46 is via interface 45. Such variation in the type and number of drivers and sensors influences the degree of complication in the control operation. In FIG. 2, the reference numeral 47 represents a DMA (Direct Memory Access) controller.

A paper feeding operation according to a first embodiment of the present invention is described hereinafter, referring to the timing chart as shown in FIG. 3.

At the time of conveying the cut sheet of paper, the movement of the paper feeding motor 26 is started. At this time, a paper feeding clutch is turned on and the paper feeding roller 2 is rotated. Thereby, the aforementioned paper separating/feeding operation can be performed for the top cut sheet of paper.

At the time of initiating movement of the paper feeding motor 26, the transfer voltage (current) value equalized to GND level when the rotation of the paper feeding motor is started, is set to zero volts. In such a state, when the cut sheet of paper is not detected by the pre-registration sensor 7 after the first paper feeding operation (e.g., when the cut sheet of paper does not arrive at the sensor 7), the paper feeding operation is performed again by operating the paper feeding clutch again as shown.

FIG. 3 shows the case in which the paper feeding operation has been performed three times prior to a normal (correct) paper feeding operation being performed. Of course, the number of paper feeding attempts prior to a successful feeding operation may vary. That is, FIG. 3 shows the paper feeding clutch having been turned on and turned off three times. The light writing-in operation is performed for "writing" onto the photosensitive belt 8 by the laser light L, after a constant time period t elapses once a successful paper feeding operation has been performed and the pre-registration sensor 7 detects the cut sheet of paper.

The above-mentioned time period t is set in overall consideration of the turning-on time of the charging unit 11, the developing unit 13, etc. and the condition of arranging the respective members on the photosensitive belt 8. That is, the writing operation is not performed until after the sheet of paper is detected and, not until after the charging unit 11 has been set to uniformly charge the photosensitive belt 8.

When the pre-registration sensor 7 detects the cut sheet of paper, the cut sheet of paper is conveyed by the registration roller 6 with the timing as mentioned before. In such a state, the transfer current (voltage) of the transfer roller 14 is changed to the normal transfer current (voltage) with the timing (elapsed time T) so that when the cut paper arrives at the transferring position at the transfer roller 14 the aforementioned transferring operation can be performed.

The time period of keeping the voltage of the transfer roller 14 at approximately zero volts as mentioned before is a combination of the time period from starting the operation of conveying a cut sheet of paper (turning-on of the paper feeding motor 26) to detecting the cut sheet of paper by use of the pre-registration sensor 7 plus a time period from detecting the cut sheet of paper until a constant time period T has elapsed.

Second Embodiment

Figure 4:
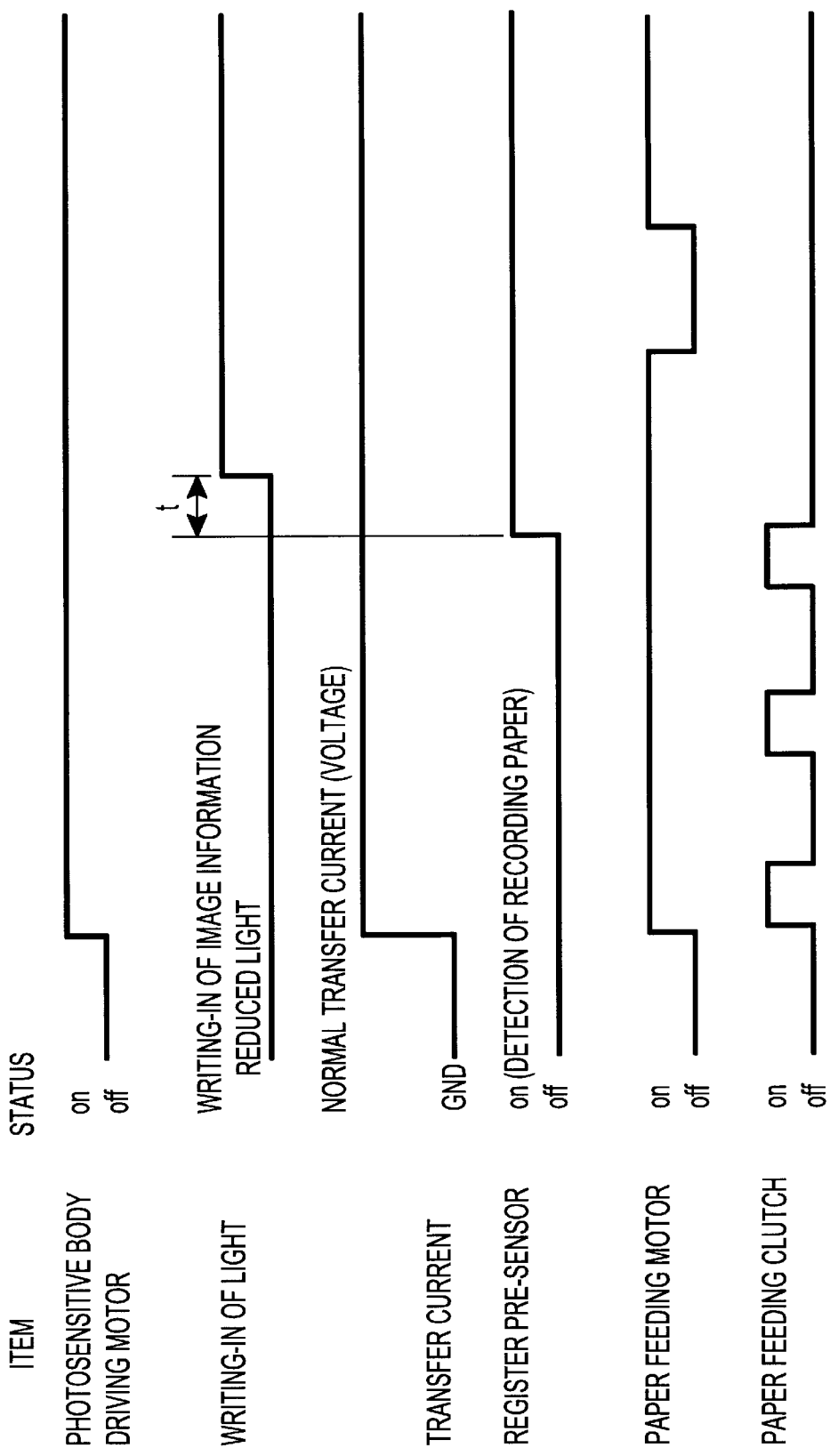
FIG. 4 is a timing chart for explaining the paper feeding operation according to a second embodiment of the present invention.

FIG. 4 is a timing chart for explaining the paper feeding operation according to the second embodiment of the present invention.

In the second embodiment, controlling of the paper feeding operation in the MPU (Micro Processing Unit) 42 is different from that of the first embodiment. However, the other structure of the second embodiment is the same as the structure of the first embodiment.

In FIG. 4, the rotation of the paper feeding motor 26 initiated to perform an initial conveying operation for conveying a cut sheet of paper. At the same time, the paper feeding clutch is turned on, and the paper feeding roller 2 is rotated. Thereby, the operation of separating/feeding the cut sheet of paper is performed. At this time, the respective biases of the charging unit 11 and the developing unit 13 are controlled to a normal value and the photosensitive body driving motor is initiated to start rotating the photosensitive body. The transfer voltage (current) value, equalized to GND level prior to the time of initiating the rotation of the paper feeding motor, is set to the normal transfer voltage. In such state, when the cut sheet of paper is not detected by the pre-registration sensor 7 after the first paper feeding operation (e.g., when the cut sheet of paper does not arrive at the sensor 7), the paper feeding operation is performed again.

FIG. 4 shows the case in which the paper feeding operation has been performed three times prior to a normal (correct) paper feeding operation being performed. That is, FIG. 4 shows the paper feeding clutch having been turned on and turned off three times. Of course, it may be necessary to perform the paper feeding operation more or less times prior to a successful paper feeding operation being performed. The writing operation is performed for "writing" onto the photosensitive belt 8 by the laser light L, after a constant time period t elapses once the normal paper feeding operation has been performed and the pre-registration sensor 7 detects the cut sheet of paper.

The above-mentioned time period t is set in overall consideration of the turning-on time of the charging unit 11, the developing unit 13, etc. or the condition of arranging the respective members on the photosensitive belt 8.

When the pre-registration sensor 7 detects the cut sheet of paper, the cut sheet of paper is conveyed by the registration roller 6 with the timing as mentioned before. At this time, the toner image is transferred onto the cut sheet of paper by the transfer roller 14.

Hereupon, the judgement on whether the cut sheet of paper has been properly conveyed can be done depending on whether the cut paper arrives at the pre-registration sensor 7 as mentioned before.

Reasons for the paper not being properly conveyed, include the case of improper operations in the separating and feeding of the paper, the paper feeding motor 26 not operating normally for driving the paper feeding mechanism, etc. These are thought to be the main reasons for the paper not being properly conveyed. If such problems arise in the paper feeding operation, even though the paper feeding operation is repeated, the paper feeding operation may not always be performed normally, even after several attempts.

Third Embodiment

In such situation as mentioned heretofore, in the third embodiment of the present invention, the paper feeding control is performed in order to cope with the problems arising when malfunctions (disordered rotation, etc.) occur with the paper feeding motor serving as the main driving source of the paper feeding mechanism, and in particular, when a stepping motor, frequently used as the paper feeding motor, malfunctions, as well as other problems which occur in the motor operation (driving), etc.

Figure 5:
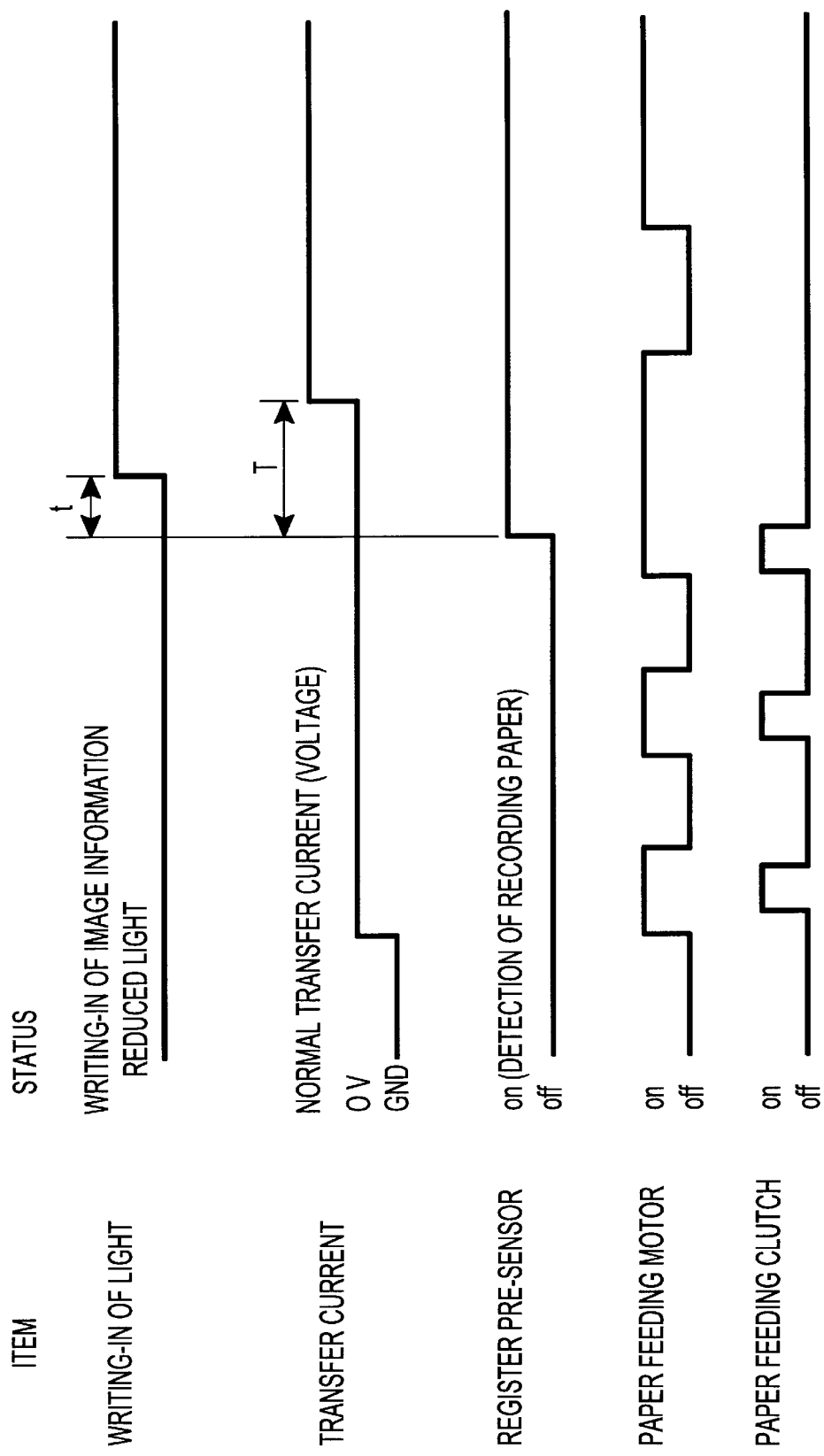
FIG. 5 is a timing chart for explaining the paper feeding operation according to a third embodiment of the present invention.

FIG. 5 is a timing chart for explaining the paper feeding operation according to the third embodiment of the present invention. Although the control structure of the third embodiment in the MPU 42 of the stepping motor differs from that of the first embodiment, the other structure is same as that of the first embodiment.

In FIG. 5, operation of the stepping motor 26 is initiated at the time of conveying the cut sheet of paper, the paper feeding clutch is turned on, and the paper feeding roller 2 is rotated. In such a way, the operations of separating and feeding the cut sheet paper can be performed. The value of the transfer voltage (current), equalized to GND level at the time of initiating the operation of the stepping motor, is set to zero volts at this time.

When the cut sheet of paper is not detected by the pre-registration sensor 7 at the time of performing the first paper feeding operation (namely, when the cut sheet of paper does not arrive at the pre-registration sensor 7), the operation of driving the stepping motor 26 (paper feeding motor) is temporarily stopped. At this time, although the phase of the motor is not changed over, it is necessary to continue the (magnetic) excitement with a constant current. The operation of the stepping motor is initiated again after a predetermined time period. After a constant time period in which the motor driving has become stable has elapsed, the paper feeding operation is attempted once again.

FIG. 5 shows the case in which the paper feeding operation has been performed three times prior to a normal paper feeding operation being performed. In this embodiment, after the normal paper feeding has been performed, the operation of writing onto the photosensitive belt 8 by use of the laser light L is performed, after a predetermined time period t elapses from the time of detecting the cut sheet of paper by use of the pre-registration sensor 7. The above-mentioned time period t is set in overall consideration of the turning-on time of the charging unit 11, the developing unit 13, etc., or the condition of arranging the respective members on (around the photosensitive) belt.

When the pre-registration sensor 7 detects the cut sheet of paper, the cut sheet of paper is conveyed with the timing as mentioned before. In such a state, the transfer current (voltage) of the transfer roller 14 is changed to the normal transfer current (voltage) with the timing when the cut paper arrives at the transfer position of the transfer roller 14, and then the aforementioned transferring operation is performed.

As mentioned heretofore, in the third embodiment, when the cut paper cannot be conveyed, the operation of driving the stepping motor serving as the main driving source in the paper feeding mechanism is temporarily stopped, and thereafter the operation of initiating again the motor including a slow-up operation is performed. Consequently, a further stable paper feeding operation can be realized.

As is apparent from the foregoing description, even though the cut sheet of paper cannot be normally fed and as the result the paper feeding operation is repeated, according to the facsimile device of the present invention, the latent image formation is performed on the standard basis of the detection by the pre-registration sensor, and zero-volt level voltage is applied to the transfer medium until the point in time when the cut paper arrives at a place near the transfer position. Consequently, the toner for the normal development does not arrive at the transfer medium (roller) in the state of the non-existence of the cut sheet of paper, and thereby the dirt pollution due to the positively-charged toner being transferred onto the transfer medium (roller) can be prevented.

Accordingly, even in the structure in which the electrophotographic photosensitive body is brought into direct contact with the transfer medium (roller) and negatively (inversely)-charged toner exists on the electrophotographic photosensitive body since the transfer roller is at the zero-volt level, the Coulomb's force is weak (faint) and thereby the dirt pollution on the transfer roller due to the inversely-charged toner can be prevented.

Furthermore, even when the cut sheet of paper cannot be normally fed and as a result the paper feeding operation is repeated, according to the facsimile device of the present invention, the latent image formation is performed on the standard basis of the detection by the pre-registration sensor, and the charge of the normal transfer current level is not applied to the transfer medium until the time point when the cut sheet of paper arrives at a place near the transfer position. Consequently, the toner for normal development does not arrive at the transfer medium when the cut sheet of paper is not present, and thereby the dirt pollution due to the positively-charged toner onto the transfer medium (roller) can be prevented.

Furthermore, even in the structure in which the electrophotographic photosensitive body is brought into direct contact with the transfer medium (roller) and the negatively (inversely)-charged toner exists on the electrophotographic photosensitive body, since the transfer roller is at the normal transfer level, the Coulomb's force repelling the inversely-charged toner is exerted upon the transfer roller and thereby the dirt pollution on the transfer roller due to the inversely charged toner can be positively prevented.

Furthermore, in consideration of the problems of the malfunction (disordered rotation, etc.) of the stepping motor serving as the main driving source of the paper, when the cut sheet of paper cannot be conveyed, the paper feeding operation including the operation of starting again the drive of the stepping motor is performed, and thereby the further stable paper feeding operation can be done.

Although the embodiments refer to cut sheets of paper as the recording media, other types of cut sheet recording media may be used.

The first through third embodiments of the present invention have been described heretofore. However, other numerous embodiments or numerous modifications or variations of the invention are possible in light of the above teachings. It is therefore to be understood that within the scope of the appended claims, the invention may be practiced otherwise than as specifically described herein.

Having now fully described embodiments of the invention, it will be apparent to one of ordinary skill in the art that many changes and modifications can be made thereto without departing from the spirit and scope of the invention as set forth herein.

This application is based on Japanese Patent Application No. JPAP10-254,106, filed on Sep. 8, 1998, the entire contents of which are herein incorporated by reference.

What is claimed is:

1. A facsimile device comprising:
   an electrophotographic photosensitive body on which a toner image is formed and capable of being brought into contact with a sheet of a recording media for recording the toner image on the sheet of recording media based on received data;
   a feeding device for conveying sheets of recording media via a feeding system to a transfer position;
   an image transferring device provided at the transfer position for transferring toner image to said sheets of recording media conveyed to the transfer position by said feeding system at a nip portion formed between said electrophotographic photosensitive body and said sheet of recording media;
   a registration roller for controlling a timing at which said sheet of recording media is conveyed to said transfer position; and
   a pre-registration sensor for detecting said sheet of recording media, conveyed by said feeding device, at an upstream side of the said registration roller; and
   a controller for controlling a timing of application of at least one of a voltage level and a transfer current level of said image transferring device based on an output by said pre-registration sensor.

2. A facsimile device as recited in claim 1, wherein when said feeding device attempts to convey a sheet of recording media and said pre-registration sensor does not detect a conveyed sheet, the controller controls said feeding device to attempt once again to convey a sheet of recording media.

3. A facsimile device as recited in claim 2, wherein after said feeding device starts to convey a sheet of recording media, said controller performs a control operation for applying an approximately zero-level voltage to said transferring device during a time period until said pre-registration sensor detects said sheet of recording media and a time period prior to a constant time period elapsing after said pre-registration sensor detects said sheet of recording media.

4. A facsimile device as recited in claim 3 wherein said controller performs a second control operation for forming a latent image on said electrophotographic photosensitive body after a second constant time period has elapsed from the time when said pre-registration sensor detects said sheet of recording media.

5. A facsimile device as recited in claim 1, wherein after said feeding device starts to convey a sheet of recording media said controller performs a control operation for applying an electric charge of normal transfer current level to said transferring device during a time period until said pre-registration sensor detects said sheet of recording media and a time period prior to a constant time period elapsing after said pre-registration sensor detects said sheet of recording media.

6. A facsimile device as recited in claim 5, wherein said controller performs a second control operation for forming a latent image on said electrophotographic photosensitive body after a second constant time period has elapsed from the time when said pre-registration sensor detects said sheet of recording media.

7. The facsimile device as recited in claim 5, further comprising a stepping motor for driving the feeding device, wherein said controller, when said feeding device attempts to convey a sheet of recording media and thereafter said pre-registration sensor detects that said sheet of recording media has not been conveyed, performs control operations of temporarily stopping driving of the stepping motor and starts again the driving of said stepping motor in order to again attempt to convey said sheet of recording media, and wherein after a second constant time period elapses from the time when said pre-registration sensor detects said sheet of recording media, said controller performs control operations for forming a latent image on said electrophotographic photosensitive body.

8. The facsimile device as recited in claim 1, further comprising a stepping motor for driving the feeding device, wherein said controller, when said feeding device attempts to convey a sheet of recording media and thereafter said pre-registration sensor detects that said sheet of recording media has not been conveyed, performs control operations of temporarily stopping driving of the stepping motor and starts again the driving of said stepping motor in order to again attempt to convey said sheet of recording media, and wherein after a constant time period elapses from the time when said pre-registration sensor detects said sheet of recording media, said controller performs control operations for forming a latent image on said electrophotographic photosensitive body.

9. A facsimile comprising:

a recording device for forming a toner image on an electrophotographic photosensitive body on a basis of received data;

a feeding device for conveying sheets of recording media via a feeding path to a transfer position, said feeding device being driven by a stepping motor as a main driving source;

an image transferring device provided at the transfer position for transferring the toner image formed on said electrophotographic photosensitive body to said sheet of recording media conveyed to the transfer position by said feeding device;

a registration roller for controlling a timing at which said sheet of recording media is conveyed to said transfer position;

a pre-registration sensor for detecting said sheet of recording media conveyed by said feeding device at an upstream side of said registration roller; and a controller for controlling the facsimile device, wherein when said feeding device attempts to convey a sheet of recording media and thereafter said pre-registration sensor detects that said sheet of recording media has not been properly conveyed, the controller controls driving of the stepping motor to temporarily stop driving of the stepping motor and thereafter driving of the stepping motor is started again in order to attempt to again convey the sheet of recording media, and wherein after a constant time period has elapsed from the time when said pre-registration sensor detects said sheet of recording media, a latent image is formed on said electrophotographic photosensitive body.

10. A facsimile device comprising:

an electrophotographic photosensitive body on which toner image is formed and capable of being brought into contact with a sheet of recording media for recording the toner image on the sheet of recording media based on received data;

feeding means for conveying sheets of recording media via a feeding system to a transfer position;

image transferring means provided at the transfer position for transferring toner image to said sheets of recording media conveyed to the transfer position by said feeding means at a nip portion formed between said electrophotographic photosensitive body and said sheet of recording media;

registration roller means for controlling a timing at which said sheet of recording media is conveyed to said transfer position; and pre-registration sensor means for detecting said sheet of recording media, conveyed by said feeding means, at the upstream side of the said registration roller means; and control means for controlling a timing of application of at least one of a voltage level and a transfer current level of said image transferring means based on an output by said pre-registration sensor means.

11. A facsimile device as recited in claim 10, wherein when said feeding means attempts to convey a sheet of recording media and said pre-registration sensor means does not detect a conveyed sheet, the control means controls said feeding means to attempt once again to convey a sheet of recording media.

12. A facsimile device as recited in claim 11, wherein after said feeding device starts to convey a sheet of recording media, said control means performs a control operation for applying an approximately zero-level voltage to said image transferring means during a time period until said pre-registration sensor means detects said sheet of recording media and a time period prior to a constant time period elapsing after said pre-registration sensor means detects said sheet of recording media.

13. A facsimile device as recited in claim 12, wherein said control means performs a second control operation for forming a latent image on said electrophotographic photosensitive body, after a second constant time period has elapsed from the time when said pre-registration sensor means detects said sheet of recording media.

14. A facsimile device as recited in claim 10, wherein after said paper feeding means starts to convey a sheet of recording media, said control means performs a control operation for applying an electric charge of normal transfer current level to said image transferring means during a time period until said pre-registration sensor means detects said sheet of recording media and a time period prior to a constant time period elapsing after said pre-registration sensor means detects said sheet of recording media.

15. A facsimile device as recited in claim 14, wherein said control means performs a second control operation for forming a latent image on said electrophotographic photosensitive body, after a second constant time period has elapsed from the time when said pre-registration sensor means detects said sheet of recording media.

16. The facsimile device as defined in claim 14, further comprising a stepping motor for driving the feeding means, wherein said control means, when said feeding means attempts to convey a sheet of recording media and thereafter said pre-registration sensor means detects that said sheet of recording media has not been properly conveyed, performs control operations of temporarily stopping driving of the stepping motor and thereafter starts again the driving of said stepping motor in order to again attempt to convey said sheet of recording media, and wherein after a second constant time period elapses from the time when said pre-registration sensor means detects said sheet of recording media, said controller performs control operations forming a latent image on said electrophotographic photosensitive body.

17. The facsimile device as defined in claim 14, wherein said recording media comprises cut sheets of paper.

18. A facsimile device comprising:

recording means for forming a latent image on an electrophotographic photosensitive body on a basis of received data;

toner image forming means for forming a toner image on the electrophotographic photosensitive body having the latent image formed thereon;

paper feeding means for conveying sheets of paper via a paper feeding path to a transfer position, said paper feeding means being driven by a stepping motor as a main driving source;

image transferring means provided at the transfer position for transferring the toner image formed on said electrophotographic photosensitive body to said sheet of paper conveyed to the transfer position by said paper feeding means;

registration roller means for controlling a timing at which said sheet of paper is conveyed to said transfer position;

pre-registration sensor means for detecting said sheet of paper conveyed by said paper feeding means at an upstream side of said registration roller means; and a controller for controlling the facsimile device, wherein when said paper feeding means attempts to convey a sheet of paper and thereafter said pre-registration sensor means detects that said sheet of paper has not been properly conveyed, the controller controls driving of the stepping motor to temporarily stop driving the stepping motor and thereafter driving of the stepping motor is started again in order to attempt to convey again the sheet of paper, and wherein after a constant time period has elapsed from the time when said pre-registration sensor means detects said sheet of paper, the latent image is formed on said electrophotographic photosensitive body.

19. A method of controlling the operation of a facsimile device comprising the steps of:

forming a toner image on an electrophotographic photosensitive body capable of being brought into contact with a sheet of paper for recording the toner image on the sheet of paper based on received data;

conveying a sheet of paper to a transfer position via a paper feeding path by use of a paper feeding system;

transferring the toner image to said sheet of paper conveyed to the transfer position by said paper feeding system at a nip portion formed between said electrophotographic photosensitive body and said sheet of paper by use of an image transferring system;

controlling a timing at which said sheet of paper is conveyed to said transfer position by use of a registration roller;

detecting said sheet of paper, conveyed by said paper feeding system, at an upstream side of the said registration roller by use of a pre-registration sensor;

controlling a timing of application of said image transferring step such that at least one of a voltage level and a transfer current level of said image transferring step is controlled based on a result of said detecting step.

20. A method as recited in claim 19, wherein when said conveying step attempts to convey a sheet of paper and said detecting step does not detect a conveyed sheet, another attempt is made to convey the sheet of paper.

21. A method as recited in claim 20, further comprising a step for applying an approximately zero-level voltage to said image transferring system after starting the paper conveying operation by said paper feeding system, during a time period until said pre-registration sensor detects said sheet of paper and a time period prior to a constant time period elapsing after said pre-registration sensor detects said sheet of paper.

22. A method as recited in claim 21, further comprising a step of performing another control operation for forming a latent image on said electrophotographic photosensitive body after a second constant time period has elapsed from the time when said pre-registration sensor detects said sheet of paper.

23. The method as recited in claim 22, further comprising the steps of:

performing the operation of conveying the sheet of paper by use of said paper feeding system and thereafter not conveying said sheet of paper at the time of forming the image;

performing control operations of temporarily stopping the driving of a stepping motor used for driving said paper feeding system and thereafter starting again the driving of said stepping motor in order to attempt again to convey said sheet of paper; and performing control operations of forming a latent image on said electrophotographic photosensitive body after a third constant time period elapses from the time point when said pre-registration sensor detects said sheet of paper.

24. A method of controlling operation of a facsimile device comprising the steps of:

forming a toner image on an electrophotographic photosensitive body capable of being brought into contact with a sheet of paper for recording the toner image on the sheet of paper based on received data;

conveying a sheet of paper to a transfer position via a paper feeding path by use of a paper feeding system;

transferring a toner image to said sheet of paper conveyed to the transfer position by said paper feeding system at a nip portion formed between said electrophotographic photosensitive body and said sheet of paper by use of an image transferring system;

controlling a timing at which said sheet of paper is conveyed to said transfer position by use of a registration roller; and detecting said sheet of paper, conveyed by said paper feeding system, at an upstream side of the said registration roller by use of a pre-registration sensor;

controlling a timing of application of said image transferring step such that at least one of a voltage level and a transfer current level of said image transferring step is controlled based on a result of said detecting step.

25. A method as recited in claim 24, wherein when said conveying step attempts to convey a sheet of paper and said detecting step does not detect a conveyed sheet, another attempt is made to convey the sheet of paper.

26. A method as recited in claim 25, further comprising a step of applying an electric charge of normal transfer current level during said transferring step, after starting the paper conveying step by said paper feeding system, during a time period until said pre-registration sensor detects said sheet of paper and a time period prior to a constant time period elapsing after said pre-registration sensor detects said sheet of paper.

27. A method as recited in claim 26, further comprising a step of performing another control operation for forming a latent image on said electrophotographic photosensitive body after a second constant time period has elapsed from the time when said pre-registration sensor detects said sheet of paper.

28. The method as recited in claim 26, further comprising the steps of:

performing the operation of conveying the sheet of paper by use of said paper feeding system and thereafter not conveying said sheet of paper at a time of forming the image;

performing control operations of temporarily stopping the driving of a stepping motor used for driving said paper feeding system and thereafter starting again the driving of said stepping motor in order to attempt again to convey said sheet of paper; and performing control operations of forming a latent image on said electrophotographic photosensitive body after a third constant time period elapses from a time when said pre-registration sensor detects said sheet of paper.

29. A method of controlling the operation of a facsimile device comprising the steps of:

forming a toner image on an electrophotographic photosensitive body on the basis of received data;

conveying a sheet of paper to a transfer position via a paper feeding path using a stepping motor as a main driving source of a paper feeding device;

transferring the toner image formed on said electrophotographic photosensitive body to said sheet of paper conveyed to the transfer position by said paper feeding device by use of an image transferring device;

controlling a timing at which said sheet of paper is conveyed to said transfer position;

detecting said sheet of paper conveyed by said paper feeding device at an upstream side of a registration roller by use of a pre-registration sensor;

conveying a sheet of paper and thereafter not conveying said sheet of paper at a time of forming the image;

temporarily stopping driving of a stepping motor used for conveying the sheet of paper and starting again the driving of said stepping motor in order to again convey said sheet of paper; and forming a latent image on said electrophotographic photosensitive body, after a constant time period elapses from the time point when said pre-registration sensor detects said sheet of paper.

30. A facsimile device comprising:

recording means for forming a toner image on an electrophotographic photosensitive body on the basis of received data;

paper feeding means conveying a cut sheet of a recording medium by conveying the recording medium towards a transfer position where the toner image is transferred to the cut sheet of the recording medium;

transfer potential applying means which applies a transfer potential to the cut sheet of the transfer medium at the transfer position during the transfer of the toner image;

sensor means detecting the cut sheet of the recording medium when the cut sheet of the recording medium has been conveyed by the paper feeding means to a predetermined position before the transfer position; and control means which causes the paper feeding means to repeat the operation of conveying if the sensor means indicates that the cut sheet of the recording medium has not been conveyed by a previous conveying operation, wherein said control means causes the transfer potential applying means to be set, before the transfer of the toner image, to a previous potential at least during the time of repeating said operation of conveying of a single sheet, said previous potential being such that electrostatic attraction of inversely charged toner, which is charged to a polarity inverse to the polarity of the toner of the toner image, from the electrophotographic photosensitive body to the transfer potential applying means is weak or such that the inversely charged toner is repelled from the transfer potential applying means.

* * * * *